United States Patent [19]

Chen

[11] Patent Number: 5,732,063
[45] Date of Patent: Mar. 24, 1998

[54] OPTIC DISK DRIVE VIBRATION ABSORBING DEVICE

[75] Inventor: Chih-Pin Chen, Taipei, Taiwan

[73] Assignee: Behavior Tech Computer Corporation, Taipei, Taiwan

[21] Appl. No.: 753,091

[22] Filed: Nov. 20, 1996

[51] Int. Cl.$^6$ .................................................... G11B 33/08
[52] U.S. Cl. .................... 369/263; 360/99.06; 360/97.02
[58] Field of Search .................................. 369/263, 75.1, 369/75.2, 97.01–98.01, 98.07, 99.04, 99.08

[56] References Cited

U.S. PATENT DOCUMENTS

| | | | |
|---|---|---|---|
| 4,796,849 | 1/1989 | Fouassier | 369/263 |
| 5,177,733 | 1/1993 | Koike et al. | 369/263 |
| 5,309,421 | 5/1994 | Fujisawa | 360/97.01 |
| 5,359,587 | 10/1994 | Uehara | 369/263 |
| 5,416,762 | 5/1995 | Ohmori et al. | 360/99.06 |
| 5,479,304 | 12/1995 | Morita | 360/99.08 |
| 5,587,855 | 12/1996 | Kim | 360/97.02 |

Primary Examiner—Jefferson Evans
Attorney, Agent, or Firm—Morton J. Rosenberg; David I. Klein; Jun Y. Lee

[57] ABSTRACT

An optic disk drive includes a casing, the inside of which a driving unit is arranged. The driving unit includes a motor for rotating a disk driving wheel mounted therein. A disk holding arm is pivoted to the casing and extends above the casing to define a spacing therebetween for removably receiving a disk tray supporting an optic disk thereon to position the optic disk between a disk holding wheel rotatably provided on the disk holding arm and the disk driving wheel. The disk holding wheel holds the optic disk against the disk driving wheel to allow the optic disk to be driven by the motor. A vibration absorbing device includes a plate-like body having a front extension provided on a front edge of the body and two rear extensions provided on an opposite rear edge of the body. The front and rear extensions all have a free end on which a vertical flange is provided and the two rear extensions are spaced from each other so that the vertical flanges define a triangle to tightly fit over and thus be secured on the motor. The plate-like body further has two anchoring arms extending therefrom to be fixed to the casing so as to provide a rigid connection between the casing and the motor and thus increase the overall structural rigidity which in turn enhances the positional precision so that optimized performance can be achieved.

3 Claims, 4 Drawing Sheets

OPTIC DISK DRIVE VIBRATION ABSORBING DEVICE

FIELD OF THE INVENTION

The present invention relates generally to an optic disk drive, particularly the so-called CD-ROM used in computer systems and in particular to a vibration absorbing device for reducing and absorbing the vibration induced during the operation of the disk driving motor of the optic disk drive.

BACKGROUND OF THE INVENTION

Optic disk drives are an important data storage medium which allows a great amount of data to be stored in a single optic disk. For a computer system, such as a personal computer, an optic disk drive, usually referred to as a CD-ROM, is thus an important peripheral device which has the capability to access a great amount of data in a very time efficient manner. For a multi-media system, the optical disk drive is almost a must. The speed of the CD-ROM is an important factor in assessing the performance of the CD-ROM. With the quick development of the CD-ROM, the speed of the CD-ROM is now increased from double speed to octuple speed which is the most prevailing model nowadays. Models of higher speed are also available in the market.

Since there is such a great amount of data stored or recorded in a single optic disk and since the optic disk is using a light beam of very small diameter projected to the optic disk to be received by a data transducer located above the optic disk to "read" data from the optic disk, positional precision of an optic disk relative to the data transducer is a very important factor of the optic disk drive. The higher the operational speed is, the greater precision the disk drive needs.

For most of the optic disk drives currently available in the market, a disk driving motor is used to rotate the optic disk. The motor is provided inside a driving unit with a spindle extending out of the unit to have mounted thereon a disk driving wheel on which the optic disk is to be positioned and thus driven thereby. The operation of the motor inevitably induces vibration of the optic disk drive and thus adversely affects the positional precision.

Conventionally, resilient pads, such as rubber pads, are provided to support the driving unit and to reduce the vibration caused by the operation of the motor. The rubber pads, although to some effect in reducing the vibration, are not good enough to support the positional precision required in higher speed optic disk drives.

It is therefore desirable to provide a vibration absorbing device to be mounted within an optic disk drive to further reduce the vibration of the disk driving motor.

SUMMARY OF THE INVENTION

It is an object of the present invention to provide a vibration absorbing device mounted within an optic disk drive for further reducing the vibration of the disk driving motor of the optic disk drive.

It is another object of the present invention to provide a vibration absorbing device which comprises a single rigid member of simple structure connected between the disk driving motor and the casing of the optic disk drive so as to increase the overall structural rigidity and thus reduce the vibration of the disk driving motor for enhancing the positional precision and the performance that can be achieved by the optic disk drive.

It is a further object of the present invention to provide a vibration absorbing device which can be incorporated into optic disk drives that are currently existing without substantial modification of the optic disk drive so as to enhance the performance of the optic disk drive with a very limited cost.

In accordance with the present invention, to achieve the above objects, there is provided an optic disk drive comprising a casing, the inside of which a driving unit is arranged. The driving unit comprises a disk driving motor for rotating a disk driving wheel mounted therein. A disk holding arm is pivoted to the casing and extends above the casing to define a spacing therebetween for removably receiving a disk tray supporting an optic disk thereon to position the optic disk between a disk holding wheel rotatably provided on the disk holding arm and the disk driving wheel. The disk holding wheel has the capability to hold the optic disk against the disk driving wheel so as to allow the optic disk to be driven by the motor. A vibration absorbing device comprises a plate-like body having a front extension provided on a front edge of the body and two rear extensions provided on an opposite rear edge of the body. The front and rear extensions all have a free end on which a vertical flange is provided and the two rear extensions are spaced from each other so that the vertical flanges define a triangle to tightly fit over and be secured on the motor. The plate-like body further comprises two anchoring arms extending therefrom that are fixed to the casing so as to provide a rigid connection between the casing and the motor and thus increase the overall structural rigidity which in turn enhances the positional precision so that optimized performance can be achieved.

The features and advantages of the present invention will be readily understood from the following description of a preferred embodiment, reference being had to the attached drawings, wherein:

DETAILED DESCRIPTION OF THE PREFERRED EMBODIMENT

Figure 1:
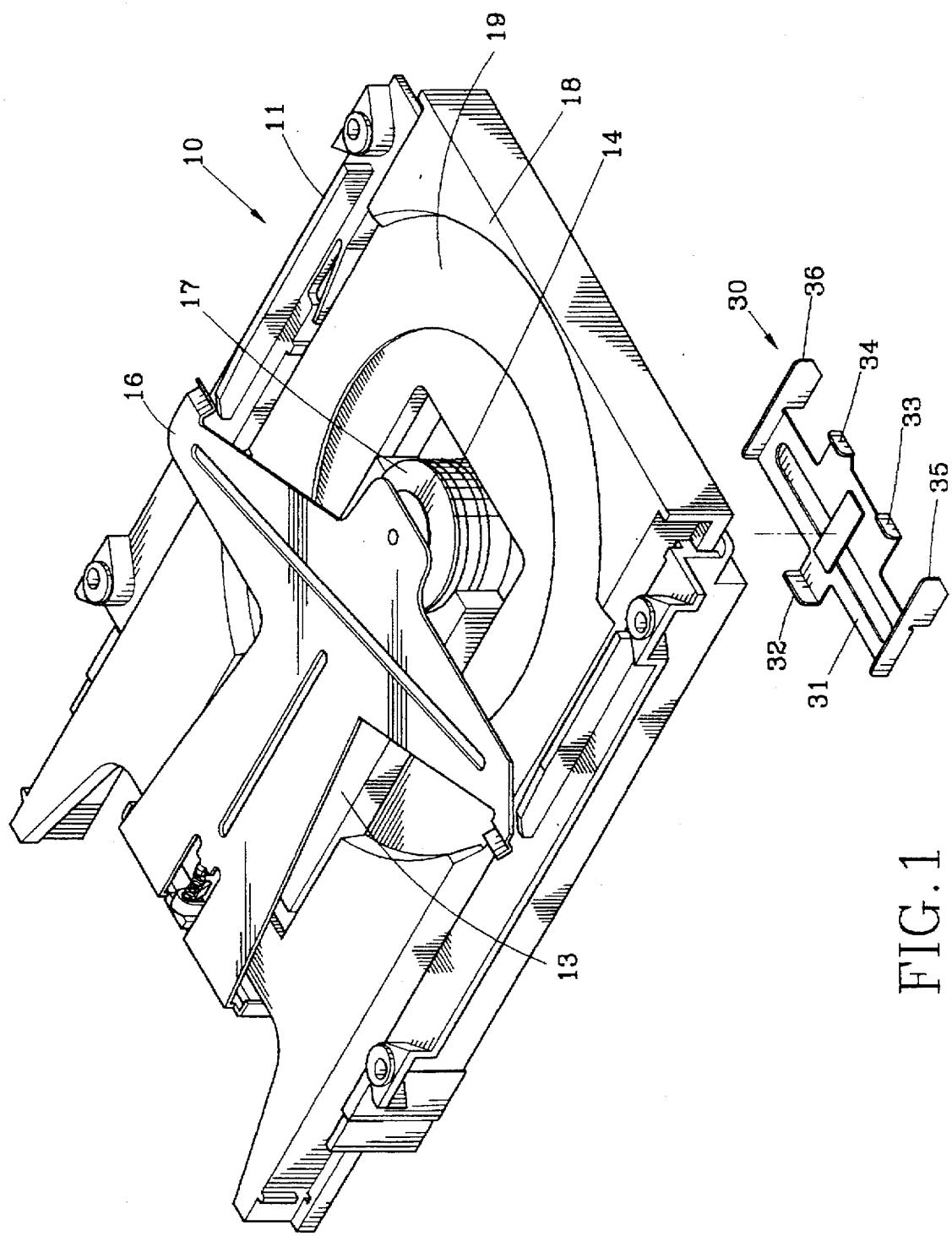
FIG. 1 is a perspective view showing an optic disk drive, together with a vibration absorbing device in accordance with the present invention, the vibration absorbing device being shown detached from the optic disk drive.
Figure 2:
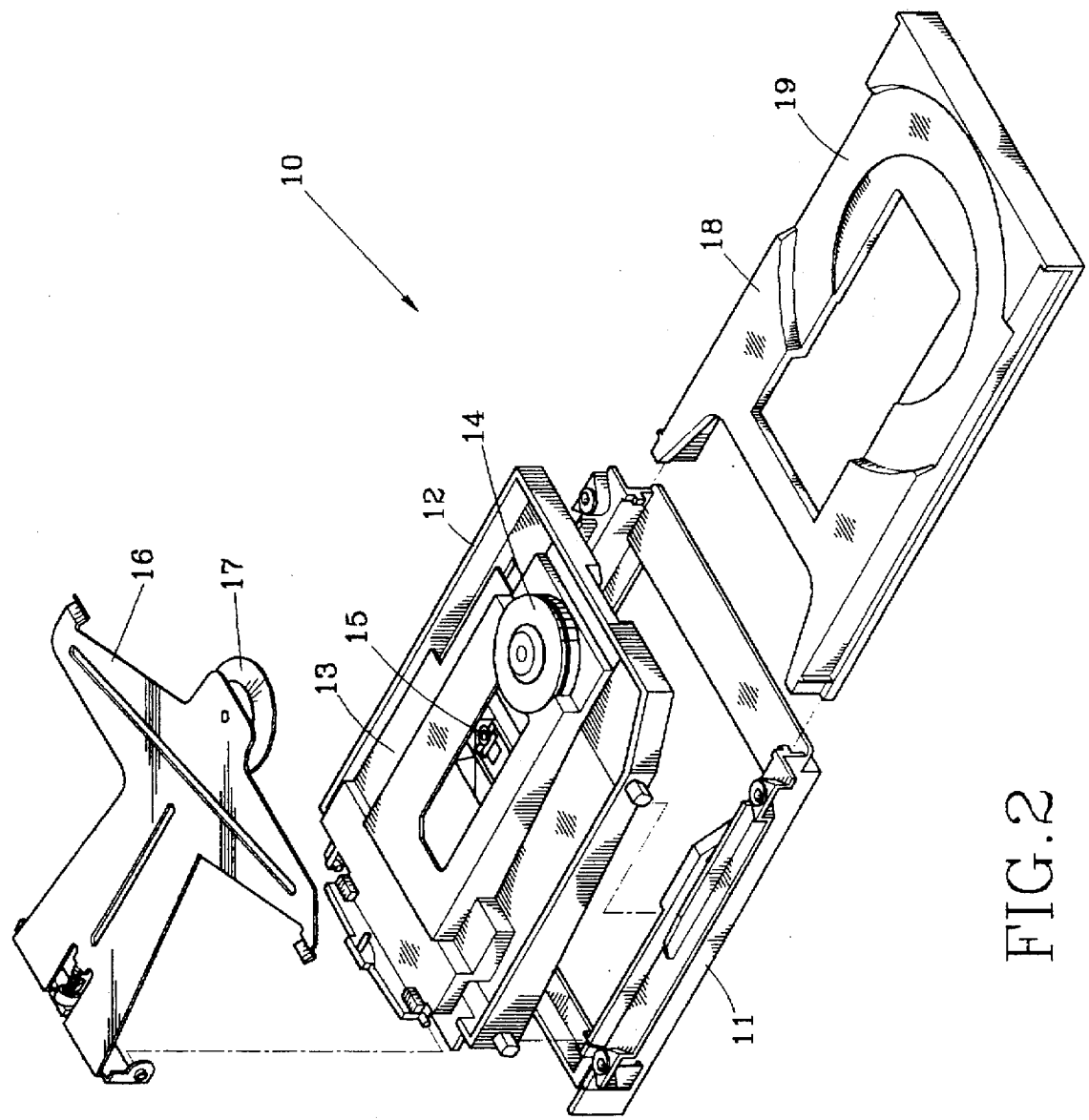
FIG. 2 is an exploded perspective view showing the optic disk drive shown in FIG. 1.

With reference to the drawings and in particular to FIGS. 1 and 2, wherein an optic disk drive broadly designated at 10, together with a vibration absorbing device constructed in accordance with the present invention, designated at 30, is shown. The optic disk drive 10 comprises an outer casing 11 defined by a bottom with two opposite side walls and a rear wall, the top and front side being open. Inside of the outer casing 11, an inner casing 12 is received and fixed in such a manner to define a side channel between each of two opposite sides thereof and the associated side wall of the outer casing 11.

A disk holding arm 16, in the form of a cantilever, has a disk holding wheel 17 rotatably mounted to the free end thereof, is pivoted at a rear wall thereof, to a rear edge of the inner casing 12 and extends above the inner casing 12 from the rear edge of the inner casing 12 toward approximately midway between the rear edge and an opposite front edge of the inner casing 12 to define a spacing therebetween for selectively and removably receiving a disk tray 18 therein. The disk tray 18 has a disk support recess 19 formed thereon to receive and hold therein an optic disk (not shown) so that when the disk tray 18 is received between the disk holding arm 16 and the inner casing 12, the disk holding wheel 17 is substantially co-axial with the optic disk. Thus, engagement between the disk holding wheel 17 and the optic disk allows the disk holding wheel 17 and the optic disk to be rotatable together.

Figure 3:
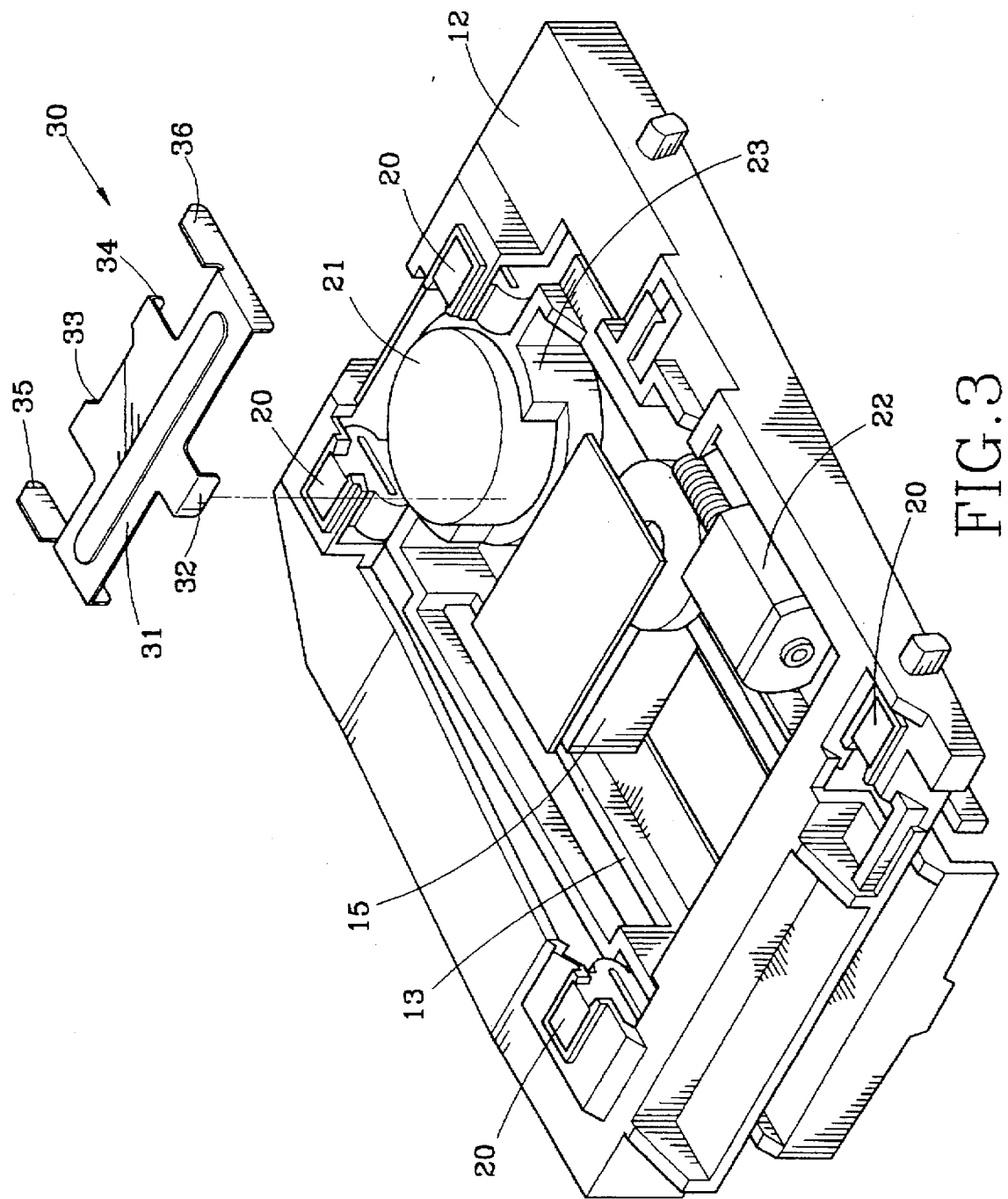
FIG. 3 is a perspective view, in an up-side-down orientation with respect to FIGS. 1 and 2, showing the inner casing of the optic disk drive and the vibration absorbing device to be mounted thereto.

Inside the inner casing 12, a driving unit 13 is disposed, see FIG. 3, which comprises a first motor 21 received within a motor holder 23 formed and fixed inside the driving unit 13. The first motor 21 has an output spindle to which a disk driving wheel 14 is fixed to be driven thereby. The disk driving wheel 14 partially extends outside the inner casing 12 to be in contact engagement with the optic disk, in a co-axial manner. By using the disk holding wheel 17 of the disk holding arm 16 to hold the optic disk against the disk driving wheel 14, the optic disk can be driven by the first motor 21 via the disk driving wheel 14.

The driving unit 13 further comprises a second motor 22 which linearly moves a data transducer 15 located inside the driving unit 13. The transducer 15 is exposed to access the optic disk in a radial direction with respect to the optic disk. The combination of the rotation of the optic disk caused by the first motor 21 and the linear movement of the data transducer 15 caused by the second motor 22 allows the data transducer 15 to be located at any desired position on the optic disk to access the data stored thereat.

The operation of the motors 21 and 22 causes vibration on the driving unit 13 which in turn adversely affects the positional precision of the data transducer 15 with respect to the optic disk. To reduce the vibration caused by the motors 21 and 22, resilient pads, such as rubber pads 20, are provided on the driving unit 13 to be in contact engagement with the inner casing 12 and thus supporting the driving unit 13 thereon so that the vibration of the driving unit 13 may be reduced by the resilient pads 20.

Using the rubber pads 20 to reduce the vibration may not be sufficient for higher positional precision required by higher speed models of the optic disk drives. In accordance with the present invention, a vibration absorbing device, generally designated at 30, see FIGS. 1, 3 and 4, is provided on the motor holder 23 to increase the structural rigidity thereof.

The vibration absorbing device 30 comprises a plate-like body 31 having a front extension 32 provided on a front edge of the body 31 and having a vertical flange formed on a free end thereof. The body 31 has two rear extensions 33 and 34 provided on a rear edge thereof, the two rear extensions being spaced from each other in a direction substantially normal to the extending direction there. Each rear extension has a free end on which a vertical flange is provided. The extensions 32, 33 and 34 are so arranged that the vertical flanges thereof define a triangle.

Figure 4:
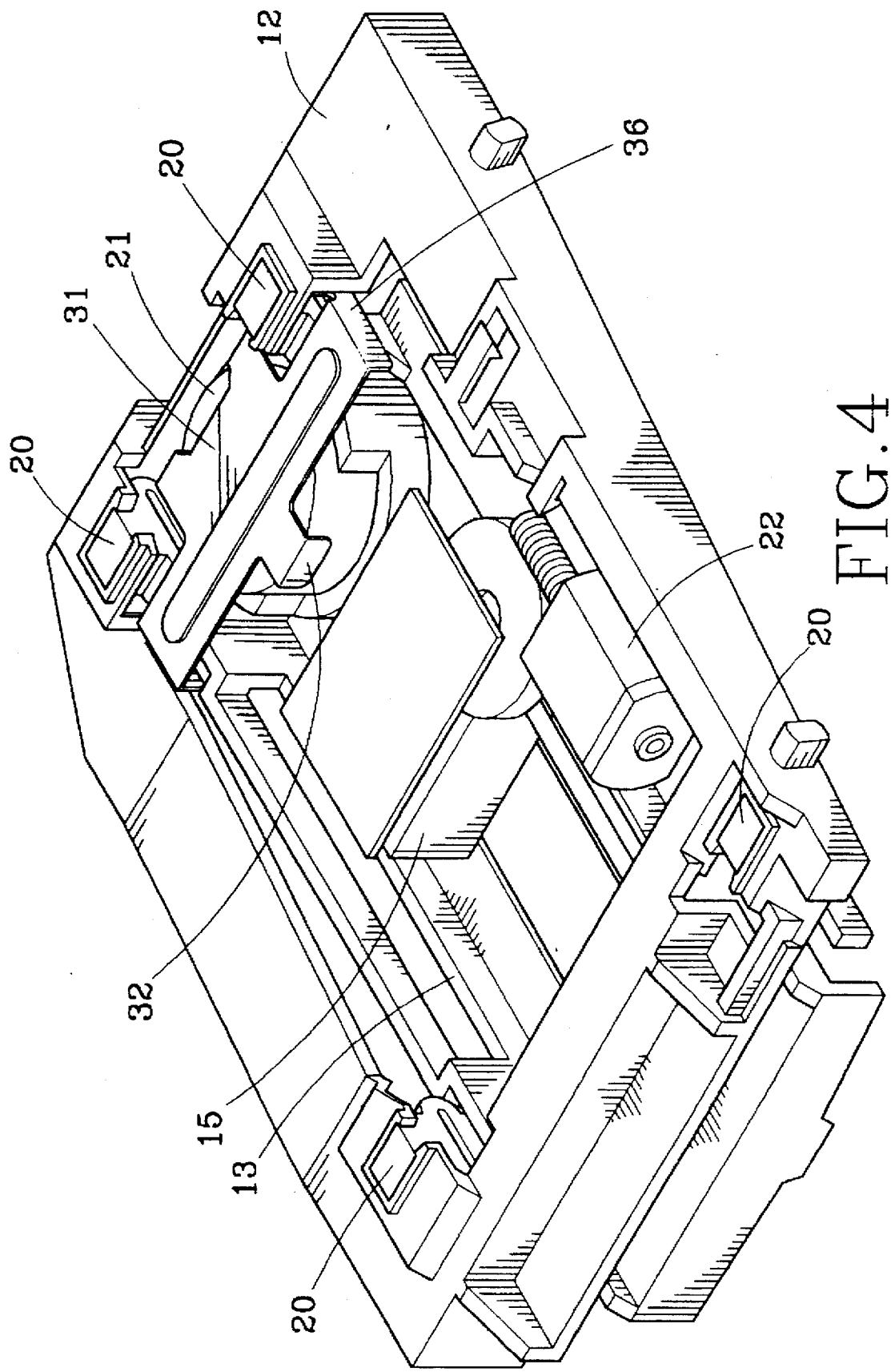
FIG. 4 is a perspective view similar to FIG. 3, but showing the vibration absorbing device mounted to the inner casing of the optic disk drive.

The vibration absorbing device 30 is dimensioned and mounted to the first motor 21 in such a manner that the three vertical flanges that are arranged into a triangular configuration tightly fit onto and are thus secured on the first motor 21, as shown in FIG. 4. The vibration absorbing device 30 further comprises two anchoring arms 35 and 36 integrally formed thereon. The anchoring arms 35 and 36 are dimensioned and located so as to be interposed and fixed between two of the rubber pads 20 and the inner casing 12, thus securing the vibration absorbing device 30 to the inner casing 12, as shown in FIG. 4.

Preferably, the vibration absorbing device 30 is made of a substantially rigid material so as to provide a rigid connection between the inner casing 12 and the first moor 21. The rigid connection provided by the vibration absorbing device 30 increases the overall structural rigidity with respect to the first motor 21 so as to further reduce the vibration of the first motor 21 during its operation. This in turn decreases the vibration other parts of the optic disk drive caused by the operation of the first motor 21 and thus enhances the positional precision of the data transducer 15 with respect to the optic disk. The performance of the optic disk drive is thus enhanced.

In accordance with the present invention, mounting the vibration absorbing device 30 inside the optic disk drive 10 requires no special tools and can be done easily. Further, the vibration absorbing device 30 may be mounted inside the optic disk drive 10 within a space that is currently present inside the optic disk drive 10 so that no substantial modification or change of the current overall construction of the optic disk drive is needed. Thus, a better performance of the optic disk drive can be achieved at a low and limited cost.

The above description is made with respect to a preferred embodiment of the present invention and for those skilled in the art, it is possible to make modifications and changes to the above-described embodiment without departing from the scope and spirit of the present invention. All these modifications and changes should be considered within the scope of the present invention as defined in the appended claims.

What is claimed is:

1. An optic disk drive comprising a casing inside which a driving unit is arranged, the driving unit comprising a motor for rotating a disk driving wheel, a disk holding arm extending above the casing to define a space therebetween and to position a disk holding wheel that is rotatably mounted to the disk holding arm opposite to the disk driving wheel for removably and selectively receiving therein a disk tray supporting an optic disk thereon so as to position the optic disk between the disk holding wheel and the disk driving wheel, the disk holding arm being pivotally coupled to a rear wall of the casing, wherein the disk holding wheel engages the optic disk against the disk driving wheel to allow the optic disk to be driven by the motor, a vibration absorbing device comprising a body of rigidity having provided thereon motor attaching means to fix the vibration absorbing device to the motor and anchoring means for fixing the vibration absorbing device to the casing so as to provide a rigid connection between the motor and the casing for increasing overall structural rigidity.

2. An optic disk drive as claimed in claim 1, wherein the motor attaching means comprises a front extension provided on a front edge of the body and two rear extensions provided on an opposite rear edge of the body, the front and rear extensions all having a free end on which a vertical flange is provided and the two rear extensions being spaced from each other so that the vertical flanges define a triangle, the vertical flanges being arranged to tightly fit over and thus fix on the motor.

3. An optic disk drive as claimed in claim 1, wherein the anchoring means comprises two anchoring arms extending from the body to be fixed to the casing.

* * * * *